Dec. 15, 1959  E. J. DIEBOLD  2,917,697
VOLTAGE EQUALIZER FOR SERIES CONNECTED RECTIFIERS
Filed Nov. 21, 1956  2 Sheets-Sheet 1
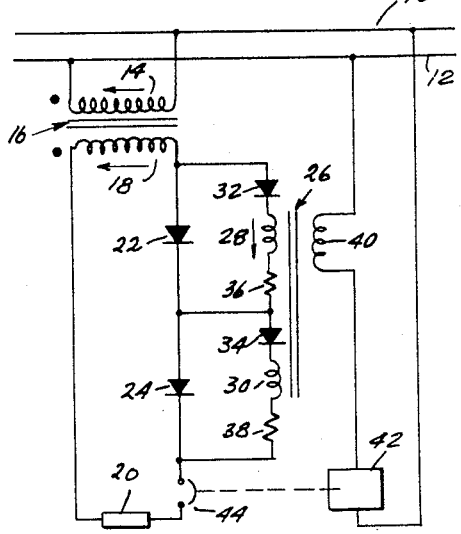
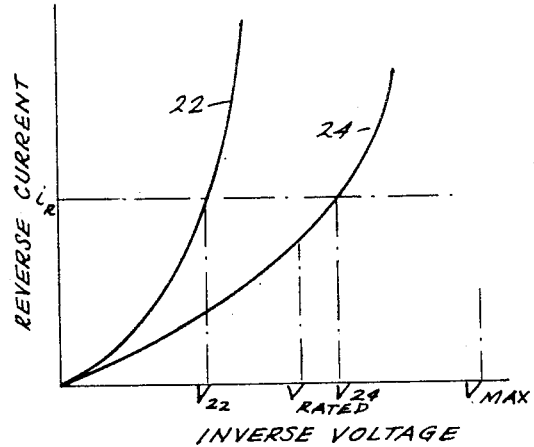
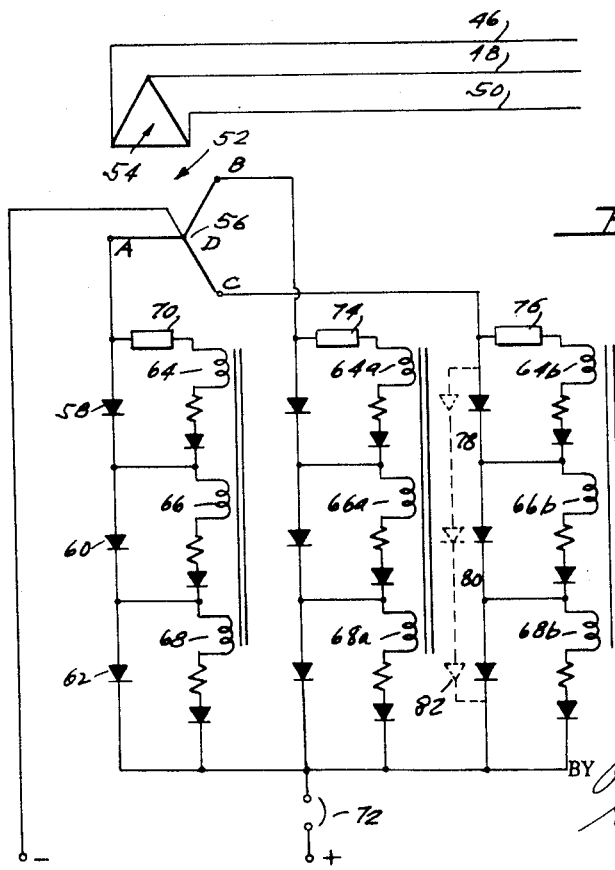
INVENTOR.
EDWARD JOHN DIEBOLD
BY
ATTORNEYS Dec. 15, 1959  E. J. DIEBOLD  2,917,697
VOLTAGE EQUALIZER FOR SERIES CONNECTED RECTIFIERS
Filed Nov. 21, 1956  2 Sheets-Sheet 2

INVENTOR.
EDWARD JOHN DIEBOLD
BY
ATTORNEYS

United States Patent Office 2,917,697
Patented Dec. 15, 1959

2,917,697

VOLTAGE EQUALIZER FOR SERIES CONNECTED RECTIFIERS

Edward John Diebold, Los Angeles, Calif., assignor to I-T-E Circuit Breaker Company, Philadelphia, Pa., a corporation of Pennsylvania Application November 21, 1956, Serial No. 623,604

15 Claims. (Cl. 321—11)

My invention relates to circuitry for equally distributing the inverse voltage across series connected rectifiers of the semi-conductor or metallic type.

When using the above noted rectifying devices for voltage higher than the inverse voltage rating of a single rectifier, it is necessary to place a given number of these rectifiers in series with one another. It is, however, necessary to underrate the voltage rating of the rectifiers since the inverse voltage will not normally be equally distributed unless the rectifiers are substantially identical in their reverse characteristics. This is true since, in the series chain, reverse current at any instant is equal for each of the rectifiers, but since the reverse impedance of the rectifiers at this current is different, the voltage drop on the rectifier will be different.

Thus, if at a specified reverse current, one rectifier has a higher impedance than a second rectifier, the voltage drop across the first rectifier will be substantially higher than that across the second. In fact, it is probable that the inverse voltage across the first rectifier may be greater than its break-down voltage, whereby damage or destruction of the rectifier will occur.

If, in order to avoid this condition, rectifiers are closely matched to one another, after an extended period of time, the rectifiers age and their reverse characteristics change so that one rectifier may then assume a greater proportion of the total inverse voltage.

For this reason, a considerable voltage derating has been necessary when connecting semi-conductor or metallic rectifiers in series with one another even though their characteristics are relatively closely matched.

As well as requiring derating of the rectifiers, the above conditions make maintenance particularly difficult since when a single rectifier of a chain is to be replaced, its characteristics may be quite different from those remaining in the chain.

The principal object of this invention is to provide a novel means for assuring an equal distribution of inverse voltage across series connected semi-conductor or metallic rectifiers even though their inverse characteristics are not matched to one another.

In principle, I connect an isolated auxiliary voltage means across each rectifier of a plurality of series connected rectifiers which applies the percentage of full inverse voltage which is to theoretically appear across that rectifier during inverse voltage conditions. The inverse current through each rectifier will be supplied by its individual auxiliary voltage means according to its own inverse characteristic since each of the voltage sources are independently connected to the rectifier and the rectifiers may then operate in series connection with one another without the heretofore required derating.

This, of course, leads to more efficient operation of a rectifier unit since a difference or change in individual rectifier characteristics will no longer change the voltage distribution across each rectifier of a chain of rectifiers as was true in the past.

Each of the individual auxiliary voltage means of my novel invention is comprised of a voltage source connected in series with an auxiliary rectifier connected to supply current through its corresponding main rectifier in an inverse direction with respect to that main rectifier whereby the particular inverse current required by the main diode with respect to the auxiliary voltage impressed thereacross may be satisfied.

In the event of a failure of the main rectifier, a large reverse current will be drawn from its corresponding auxiliary voltage source and this relatively large current may be utilized for the operation of protective apparatus for a rectifier unit. That is to say, fault sensing means can be connected to respond to currents of the magnitude that would appear in the auxiliary circuit due to failure of its corresponding main diode and this fault sensing means can thereafter be used in any of many well known ways to operate protective equipment to remove the damaged rectifier unit from the line.

Accordingly, a primary object of this invention is to provide a novel circuit for allowing the series connection of rectifiers of the semi-conductor or metallic type wherein the inverse voltage across the series chain is distributed in any desired predetermined manner.

Another object of this invention is to provide novel circuitry for allowing the connection of semi-conductor or metallic rectifiers in series with one another regardless of their inverse voltage characteristics.

Still another object of my invention is to provide an auxiliary voltage means which could comprise an auxiliary voltage source and auxiliary rectifier, for individually energizing a corresponding main rectifier in a chain of series connected rectifieres whereby the calculated voltage to appear across the main rectifier is supplied by the auxiliary transformer and the inverse current to flow at that voltage flows through the auxiliary rectifier.

A further object of this invention is to provide a novel circuitry for allowing the series connection of a plurality of rectifiers and to further provide novel fault sensing means for operating protected equipment responsive to the failure of any individual rectifier.

These and other objects of my invention will become apparent from the following description when taken in conjunction with the drawings, in which:

Figure 1 is a circuit diagram illustrating the principle of my novel invention as applied to a single phase half-wave rectifier system.

Figure 2 shows the inverse voltage characteristics of the main rectifiers used in the circuit of Figure 1.

Figure 3 shows the application of my novel invention to a three phase half-wave rectifier system.

Figure 4:
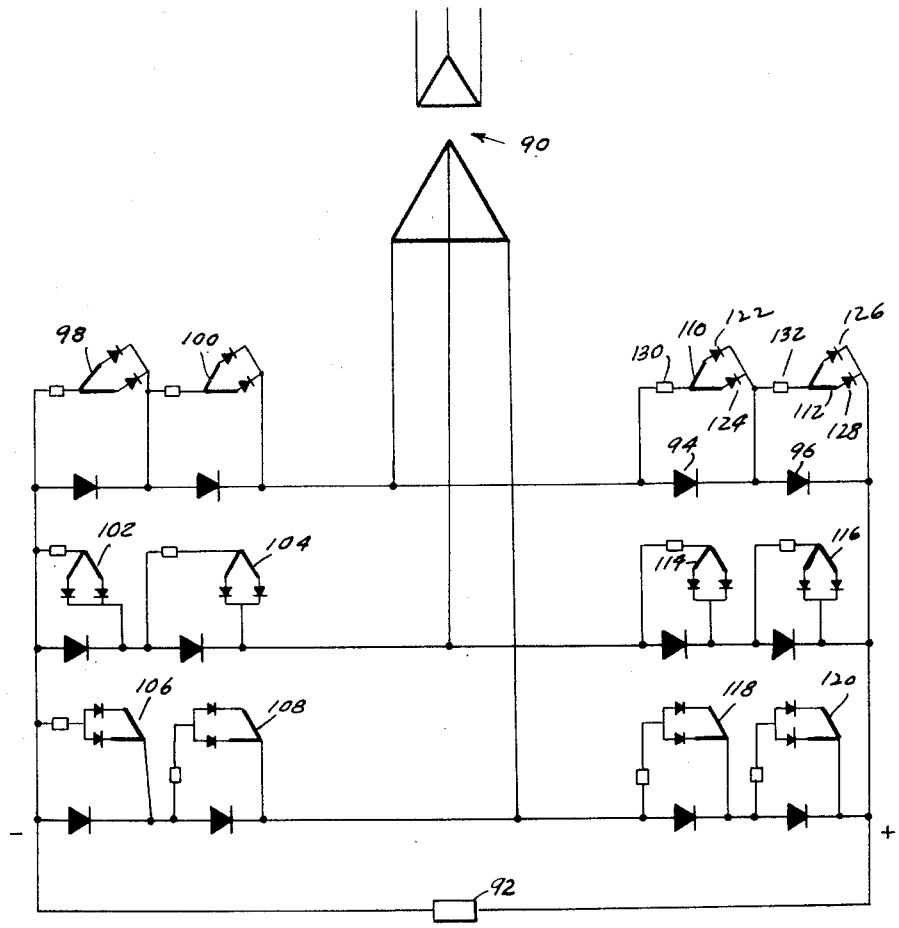
Figure 4 shows the application of my novel invention to a three phase double way circuit.

Referring now to Figure 1, a single phase A.-C. source comprising the lines 10 and 12 has a primary winding 14 of transformer 16 connected thereto. The secondary winding 18 of transformer 16 is connected to a D.-C. load 20 through the series connected rectifiers 22 and 24, it being assumed that each of rectifiers 22 and 24 have a peak inverse voltage rating which is at least half of the peak inverse voltage which is to appear across winding 18.

During reverse voltage conditions, the reverse current as a function of reverse voltage for each of diodes 22 and 24 is shown in Figure 2. Since the diodes 22 and 24 are connected in series, the same reverse current flow therethrough, is indicated as current $i_R$ in Figure 2. If, however, the diodes are mis-matched in their reverse characteristics, it is seen in Figure 2 that the reverse voltage $V_{24}$ appearing across diode 24 would be substantially larger than the reverse voltage $V_{22}$ which appears across diode 22. Hence, if each rectifier is rated at $V_{rated}$ which is one-half of the maximum inverse voltage $V_{max}$ which appears across winding 18, it is seen that the voltage $V_{24}$ appearing across diode 24 exceeds its rated voltage $V_{rated}$ and a break-down or damage of rectifier 24 will occur. It is for this reason that a substantial derating of series connected rectifiers has been necessary in the past even though the voltage characteristics may be closely matched.

Furthermore, as time passes, the individual rectifiers age and their characteristics change so that while their characteristics may be substantially identical at first, after a period of operation, their characteristics may vary so with respect to one another that break-down of one of the rectifiers will occur due to the appearance of too large an inverse voltage thereacross.

In order to ensure an equal or predetermined voltage distribution between series connected rectifiers, I provide, as seen in Figure 1, an auxiliary voltage means for each rectifier. The auxiliary voltage means of Figure 1 is comprised of secondary windings 28 and 30 of auxiliary transformer 26 connected in series with auxiliary rectifiers 32 and 34 respectively and current limiting resistors 36 and 38 respectively, for rectifiers 22 and 24 respectively. The voltage induced in windings 28 and 30 is the voltage which is theoretically to appear across diodes 22 and 24 respectively as an inverse voltage. Auxiliary rectifiers 32 and 34 are connected in a direction to prevent flow of reverse current through the load 20 while resistors 36, 38 primarily serve a current limiting function in keeping D.-C. load current through windings 28 and 30 to a small value. Clearly, each of rectifiers 32 and 34 are considerably smaller than either of rectifiers 22 or 24 since their forward current rating need only be that of the inverse current of their respective main rectifiers 22 or 24.

In the example previously given with regard to Figure 2, where an equal voltage distribution is desired for each of diodes 22 and 24, it is merely necessary with my novel invention to have the output voltage of auxiliary voltage sources 28 and 30 equal to one-half the voltage of winding 18. Hence, it is not material if inverse current of diode 22 is substantially larger than that of diode 24 since this inverse current is supplied from the auxiliary circuit including winding 28, resistor 36, and diode 32. It is only important here that the inverse voltage across each of the diodes 22 and 24 be identical.

In the case of Figure 1, windings 28 and 30 of transformer 26 are energized from primary winding 40 which is connected across the A.-C. source lines 10 and 12. Clearly, however, windings 28 and 30 could be secondary windings of transformer 16, if desired.

As a further feature of my novel invention, a fault sensing means 42 which could be of any desired type may be inserted in the primary circuit of transformer 26. This fault sensing means 42 may then be connected to operate circuit interrupting equipment in the main rectifier system such as the circuit breaker 44 which may be of any well known type.

In operation, if the rectifier 22 is damaged or destroyed, its impedance in the reverse direction is substantially lowered, thus allowing a relatively high current to flow through the diode 32 in its forward direction. This increase in current through the secondary winding 28 of transformer 26 will be reflected in the primary circuit of transformer 26 whereby fault sensing means 42 may be energized for operation. In a similar manner, a fault of diode 24 would draw a relatively high current through diode 34 which would be reflected in the primary circuit of transformer 26 to subsequently operate the circuit breaker 44 in the manner heretofore described.

It is to be noted that the protective scheme set forth above is for illustrative purposes only and that many variations thereof are still possible while coming within the scope of this invention.

By way of example, fault sensing means 42 could have been composed of individual fault sensing devices connected in series with each of the individual auxiliary rectifiers 32 and 34 respectively whereby operation of a circuit interrupting device or a short circuiting device could be obtained.

While Figure 1 describes my novel invention, in connection with a single phase one-half wave rectifier system, it is to be understood that my novel circuit can be used in any type of circuit connection.

By way of example, Figure 3 shows how my novel invention is applied to a three-phase half-wave rectifier system. Thus, in Figure 3, a three-phase source comprising the lines 46, 48 and 50 energizes a main power transformer 52 which has the primary windings 54 and the secondary windings 56. Secondary winding 56 is connected in Y and its neutral D is brought out to form the negative terminal of the rectifier system. Points A, B and C of the three windings of secondary 56 are then brought out and are connected in series with rectifying elements in the manner shown to thereby form the positive terminal of the rectifier. By way of example, phase A contains the series connected rectifiers 58, 60 and 62 while terminals B and C have similar connections.

Transformer 52 is then provided with an auxiliary secondary winding which is similar to winding 56 wherein windings 64, 66 and 68 provide one leg, windings 64a, 66a and 68a provide a second leg, and windings 64b, 66b and 68b provide the third leg, the voltages induced in each leg being identical to the voltages in the corresponding legs of secondary winding 56. Thus an inverse voltage of predetermined voltage is applied to each of rectifiers 58, 60 and 62 by means of auxiliary secondary windings 64, 66 and 68 respectively, the same being true of the rectifiers corresponding to windings.

While the auxiliary secondary windings such as windings 64, 66 and 68 have been described as being secondary windings of transformer 52, it is clear that they could be windings of an auxiliary transformer having the same phase relationship as secondary winding 56.

Operation of the auxiliary circuits of Figure 3 proceeds in a manner identical to that set forth in Figure 1 wherein the diodes 58, 60 and 62 are subjected to an inverse voltage which is determined by the voltage appearing across the secondary windings 64, 66 and 68 respectively, their individually required reverse current being supplied by their individual voltage sources.

In the event of a fault of any of the rectifiers 58, 60 or 62, fault sensing means 70 will see a considerably increased current and may then cause operation of circuit interrupting device 72 in response thereto.

In a similar manner, fault sensing means 74 and 76 may operate interrupting means 72 responsive to faults in either of phases B or C respectively.

Clearly, while three series connected rectifiers are shown in Figure 3, any required number of diodes could be used. Furthermore, the connection of rectifiers in parallel as indicated by additional rectifiers 78, 80 and 82 in phase C of Figure 3 in order to obtain a higher current rating would have no effect on the operation of my novel invention, the total inverse current being supplied from the auxiliary voltage sources being determined by the total inverse current flowing through the parallel connected diodes. However, the inverse voltage across each of the parallel connected diodes would be the same.

Figure 4 shows a further extension of my novel invention to a threephase double way circuit wherein the main power transformer 90 has its primary and secondary windings connected in delta and the D.-C. output is connected across the load 92.

Each of the positive and negative sections of each phase contains two series connected diode elements such as diodes 94 and 96 for the upper positive phase.

The transformer 90 is further provided with auxiliary windings 98—100, 102—104 and 106—108 for the upper, middle and lower negative phases respectively and 110—112, 114—116, and 118—120 for the upper, middle and lower positive phases respectively.

These auxiliary windings are associated with auxiliary diodes such as auxiliary diodes 122 and 124 of winding 110 and diodes 126 and 128 of winding 112 and resistors 130 and 132 respectively.

The phasing of each of the auxiliary windings is such that the inverse voltage induced across each branch of diodes will be that of the main secondary winding, with the auxiliary diodes conducting a forward current in the reverse direction of their associated main diode.

Hence the operation of the voltage equalizing circuits of Figure 4 will be substantially identical to that described for the case of Figures 1 and 3.

Although I have described preferred embodiments of my novel invention, many modifications and variations will now be obvious to those skilled in the art, and I therefore prefer to be limited not by the specific disclosure herein, but only by the appended claims.

I claim:

1. Electrical circuitry for imposing predetermined inverse voltage conditions on a first and second series connected rectifier; said first and second series connected rectifier being connected between an input circuit and an output circuit; said circuitry comprising a first and second auxiliary voltage source connected across said first and second series connected rectifiers respectively, and a first and second auxiliary rectifier connected in series with each of said auxiliary voltage sources; each of said first and second auxiliary rectifiers being connected to conduct forward current in the blocking direction of said first and second rectifier respectively, the inverse voltage appearing across said first and second rectifiers being determined by the voltage of said first and second auxiliary voltage sources respectively.

2. Electrical circuitry for imposing predetermined inverse voltage conditions on a first and second series connected rectifier; said first and second series connected rectifier being connected between an input circuit and an output circuit; said circuitry comprising a first and second auxiliary voltage source connected across said first and second series connected rectifiers respectively and a first and second auxiliary rectifier connected in series with each of said auxiliary voltage sources; each of said first and second auxiliary rectifiers being connected to conduct forward current in the blocking direction of said first and second rectifier respectively, the inverse voltage appearing across said first and second rectifiers being determined by the voltage of said first and second auxiliary voltage sources respectively, and fault sensing means for operating protective equipment; said fault sensing means being connected to said electrical circuitry to respond to increased current flow through one of said auxiliary rectifiers.

3. Electrical circuitry for imposing predetermined inverse voltage conditions on a first and second series connected rectifier; said first and second series connected rectifier being connected between an input circuit and an output circuit; said circuitry comprising a first and second auxiliary voltage source connected across said first and second series connected rectifier respectively; a first and second current limiting resistor, and a first and second auxiliary rectifier; each of said first and second auxiliary voltage sources respectively, said first and second current limiting resistors respectively, and said first and second auxiliary rectifiers respectively being connected in series with said first and second rectifiers respectively; each of said first and second auxiliary rectifiers being connected to conduct forward current in the blocking direction of said first and second rectifier respectively, the inverse voltage appearing across said first and second rectifiers being determined by the voltage of said first and second auxiliary voltage sources respectively.

4. Electrical circuitry for imposing predetermined inverse voltage conditions on a first and second series connected rectifier; said first and second series connected rectifier being connected between an input circuit and an output circuit; said circuitry comprising a first and second auxiliary voltage source connected across said first and second series connected rectifiers respectively, and a first and second auxiliary rectifier connected in series with each of said first and second auxiliary voltage source respectively; each of said first and second auxiliary rectifiers being connected to conduct forward current in the blocking direction of said first and second rectifier respectively, the inverse voltage appearing across said first and second rectifiers being determined by the voltage of said first and second auxiliary voltage sources respectively; the output voltage of said first and second auxiliary voltage sources being substantially equal for equally dividing inverse voltage between said first and second rectifiers.

5. Electrical circuitry for imposing predetermined inverse voltage conditions on a first and second series connected rectifier; said first and second series connected rectifier being connected between an input circuit and an output circuit; said circuitry comprising a first and second auxiliary voltage source connected across said first and second series connected rectifiers respectively; a first and second current limiting resistor, and a first and second auxiliary rectifier connected in series with each of said auxiliary voltage sources; each of said rectifiers being connected to conduct forward current in the blocking direction of said first and second rectifier respectively, the inverse voltage appearing across said first and second rectifiers being determined by the voltage of said first and second auxiliary voltage sources respectively; the voltage output of said first and second auxiliary voltage sources being substantially equal for dividing inverse voltage equally between said first and second rectifiers; and a fault sensing means for operating protective equipment; said fault sensing means being connected to respond to increased current flow through one of said auxiliary rectifiers.

6. In a rectifier unit containing a plurality of series connected rectifiers, said rectifier unit being connected to transfer power between an A.-C. and a D.-C. system, said series connected rectifiers being subjected to inverse voltage conditions from said A.-C. source; circuit means for equally distributing said inverse voltage between said plurality of series connected rectifiers regardless of the individual inverse voltage charcteristics of said plurality of rectifiers; said circuit means comprising an auxiliary voltage means for each of said plurality of rectifiers; said auxiliary voltage means being constructed to impress a predetermined voltage across its respective rectifier in an inverse direction when the voltage of said A.-C. source is of a polarity to apply inverse voltage to said respective rectifier; each of said auxiliary voltage means being further constructed to supply the individual inverse current required by each of said plurality of rectifiers when the voltage of said A.-C. source is at said last mentioned polarity.

7. In a rectifier unit containing a plurality of series connected rectifiers, said rectifier unit being connected to transfer power between an A.-C. and a D.-C. system, said series connected rectifiers being subject to inverse voltage conditions from said A.-C. source, circuit means for equally distributing said inverse voltage between said plurality of series connected rectifiers regardless of the individual inverse voltage characteristics of said plurality of rectifiers; said circuit means comprising an auxiliary voltage means for each of said plurality of rectifiers; said auxiliary voltage means being constructed to impress a predetermined voltage across its respective rectifier in an inverse direction when the voltage of said A.-C. source is of a polarity to apply inverse voltage to said respective rectifier; each of said auxiliary voltage means being further constructed to supply the individual inverse current required by each of said plurality of rectifiers when the voltage of said A.-C. source is at said last mentioned polarity; each of said auxiliary voltage means further comprising an auxiliary voltage source and a series connected auxiliary rectifier; said auxiliary rectifier being connected to pass a forward current in the blocking direction of its respective rectifier of said plurality of rectifiers.

8. In a rectifier unit containing a plurality of series connected rectifiers, said rectifier unit being connected to transfer power between an A.-C. and a D.-C. system, said series connected rectifiers being subject to inverse voltage conditions from said A.-C. source, circuit means for equally distributing said inverse voltage between said plurality of series connected rectifiers regardless of the individual inverse voltage charcteristics of said plurality of rectifiers; said circuit means comprising an auxiliary voltage means for each of said plurality of rectifiers; said auxiliary voltage means being constructed to impress a predetermined voltage across its respective rectifier in an inverse direction when the voltage of said A.-C. source is of a polarity to apply inverse voltage to said respective rectifier; each of said auxiliary voltage means being further constructed to supply the individual inverse current required by each of said plurality of rectifiers when the voltage of said A.-C. source is at said last mentioned polarity; each of said auxiliary voltage means further comprising an auxiliary voltage source, an impedance means, and a series connected auxiliary rectifier; said auxiliary rectifier being connected to pass a forward current in the blocking direction of its respective rectifier of said plurality of rectifiers; and fault sensing means for operating protective equipment; said fault sensing means being connected to respond to increased current flow through any of said auxiliary rectifiers.

9. In a rectifier unit containing a plurality of series connected rectifiers, said rectifier unit being connected to transfer power between an A.-C. and a D.-C. system, said series connected rectifiers being subject to inverse voltage conditions from said A.-C. source, circuit means for equally distributing said inverse voltage between said plurality of series connected rectifiers regardless of the individual inverse voltage characteristics of said plurality of rectifiers; said circuit means comprising an auxiliary voltage means for each of said plurality of rectifiers; said auxiliary voltage means being constructed to impress a predetermined voltage across its respective rectifier in an inverse direction when the voltage of said A.-C. source is of a polarity to apply inverse voltage to said respective rectifier; each of said auxiliary voltage means being further constructed to supply the individual inverse current required by each of said plurality of rectifiers when the voltage of said A.-C. source is at said last mentioned polarity; each of said auxiliary voltage means further comprising an auxiliary A.-C. voltage source connected in phase with the voltage of said A.-C. source and a series connected auxiliary rectifier; said auxiliary rectifier being connected to pass a forward current in the blocking direction of its respective rectifier of said plurality of rectifiers.

10. In a multiphase rectifier unit for energizing a D.-C. load from a multiphase A.-C. source, each phase of said multiphase rectifier unit comprising a plurality of series connected rectifiers, said series connected rectifiers being subjected to inverse voltage conditions from said A.-C. source; circuit means for equally distributing said inverse voltage between said plurality of series connected rectifiers regardless of the individual inverse voltage characteristics of said plurality of rectifiers; said circuit means comprising an auxiliary voltage means for each of said plurality of rectifiers; said auxiliary voltage means being constructed to impress a predetermined voltage across its respective rectifier in an inverse direction, each of said auxiliary voltage means being further constructed to supply the individual inverse current required by each of said plurality of rectifiers under said inverse voltage conditions of said A.-C. source.

11. In a multiphase rectifier unit for energizing a D.-C. load from a multiphase A.-C. source, each phase of said multiphase rectifier unit comprising a plurality of series connected rectifiers, said series connected rectifiers being subjected to inverse voltage conditions from said A.-C. source, circuit means for equally distributing said inverse voltage between said plurality of series connected rectifiers regardless of the individual inverse voltage characteristics of said plurality of rectifiers; said circuit means comprising an auxiliary voltage means for each of said plurality of rectifiers; said auxiliary voltage means being constructed to impress a predetermined voltage across its respective rectifier in an inverse direction when the voltage of said A.-C. source is of a polarity to apply inverse voltage to said respective rectifier; each of said auxiliary voltage means being further constructed to supply the individual inverse current required by each of said plurality of rectifiers when the voltage of said A.-C. source is at said last mentioned polarity; each of said auxiliary voltage means further comprising an auxiliary A.-C. voltage in phase with the corresponding phase of said A.-C. source and a series connected auxiliary rectifier; said auxiliary rectifier being connected to pass a forward current in the blocking direction of its respective rectifier of said plurality of rectifiers.

12. In a multiphase rectifier unit for energizing a D.-C. load from a multiphase A.-C. source, each phase of said multiphase rectifier unit comprising a plurality of series connected rectifiers, said series connected rectifiers being subjected to inverse voltage conditions from said A.-C. source, circuit means for equally distributing said inverse voltage between said plurality of series connected rectifiers regardless of the individual inverse voltage characteristics of said plurality of rectifiers; said circuit means comprising an auxiliary voltage means for each of said plurality of rectifiers; said auxiliary voltage means being constructed to impress a predetermined voltage across its respective rectifier in an inverse direction when the voltage of said A.-C. source is of a polarity to apply inverse voltage to said respective rectifier; each of said auxiliary voltage means being further constructed to supply the individual inverse current required by each of said plurality of rectifiers when the voltage of said A.-C. source is at said last mentioned polarity; each of said auxiliary voltage means further comprising an auxiliary A.-C. voltage in phase with the corresponding phase of said A.-C. source, an impedance means, and a series connected auxiliary rectifier; said auxiliary rectifier being connected to pass a forward current in the blocking direction of its respective rectifier of said plurality of rectifiers; and fault sensing means for operating protective equipment; said fault sensing means being connected to respond to increased current flow through any of said auxiliary rectifiers.

13. Electrical circuitry for impressing predetermined inverse voltage conditions on a first and second series connected rectifier regardless of the individual inverse voltage characteristics of said first and second rectifiers; said first and second series connected rectifiers being connectible between a first circuit and a second circuit; said electrical circuitry comprising an auxiliary voltage means for each of said first and second rectifiers; said auxiliary voltage means being constructed to impress said predetermined inverse voltage across its respective rectifier, each of said auxiliary voltage means being further constructed to supply the individual inverse current required by each of said first and second rectifiers at said predetermined reverse voltage.

14. Electrical circuitry for impressing predetermined inverse voltage conditions on a first and second series connected rectifier regardless of the individual inverse voltage characteristics of said first and second rectifiers; said first and second series connected rectifiers being connectible between a first circuit and a second circuit; said electrical circuitry comprising an auxiliary voltage means for each of said first and second rectifier; said auxiliary voltage means being constructed to impress said predetermined inverse voltage across its respective rectifier, each of said auxiliary voltage means being further constructed to supply the individual inverse current required by each of said first and second rectifiers at said predetermined reverse voltage; each of said auxiliary voltage means comprising an auxiliary voltage source and a series connected auxiliary rectifier; said rectifier being connected to pass a forward current in the blocking direction of its respective rectifier.

15. In a system for transmitting energy between a D.-C. circuit and an A.-C. circuit; a first and second series connected rectifier connected between said A.-C. circuit and said D.-C. circuit; a voltage distributing means for distributing the inverse voltage appearing across each of said first and second rectifiers in a predetermined manner when said first and second rectifiers are in a non-conducting state; said voltage distributing means comprising a first voltage source connected across said first rectifier and a second voltage source connected across said second rectifier; said first voltage source and said second voltage source being constructed to generate a flow of reverse current through their respective first and second rectifiers.

References Cited in the file of this patent

UNITED STATES PATENTS

| | | |
|---|---|---|
| 1,615,677 | Billheimer | June 3, 1920 |
| 1,867,419 | Peck | July 12, 1932 |